United States Patent [19]

Schmidt et al.

[11] Patent Number: 4,947,419
[45] Date of Patent: Aug. 7, 1990

[54] CONTAINER FOR PHOTOSENSITIVE MATERIAL

[75] Inventors: Manfred Schmidt, Kirchheim; Reimund Kluge, Unterhaching, both of Fed. Rep. of Germany

[73] Assignee: AGFA-Gevaert Aktiengesellschaft, Leverkusen, Fed. Rep. of Germany

[21] Appl. No.: 522,115

[22] Filed: Aug. 10, 1983

[30] Foreign Application Priority Data

Aug. 14, 1982 [DE] Fed. Rep. of Germany ....... 3230287

[51] Int. Cl.$^5$ ............................................. G03B 42/04
[52] U.S. Cl. ...................................... 378/187; 378/188
[58] Field of Search .............. 378/169, 181, 182, 184, 378/187, 188; 206/455; 354/275, 278, 279

[56] References Cited
FOREIGN PATENT DOCUMENTS 1112887 8/1960 Fed. Rep. of Germany .

Primary Examiner—Craig E. Church
Attorney, Agent, or Firm—Peter K. Kontler

[57] ABSTRACT

A cassette for x-ray film has a cover and a bottom. A magnetic sheet is secured to the cover and a fluorescent screen is, in turn, secured to the magnetic sheet. A ferromagnetic foil is mounted on the bottom of the cassette and carries a second fluorescent screen. When a sheet of film is inserted in the cassette and the cassette is closed, the film is flanked by the fluorescent screens, which, in turn, are flanked by the magnetic sheet and the ferromagnetic foil. The magnetic sheet and ferromagentic foil are attracted to one another and thereby urge the fluorescent screens into engagement with the film. The ferromagnetic foil is mounted on the bottom of the cassette via connecting elements which permit the ferromagnetic foil to undergo relatively large amounts of movement relative to the bottom of the cassette. In this manner, the ferromagnetic foil can conform to deformation of the cassette. Each of the connecting elements includes a flexible strip which carries an adhesive layer at both of its longitudinal edges, and the adhesive layers are offset relative to one another. One of the adhesive layers is located on that surface of the flexible strip which faces the bottom of the cassette and engages only the flexible strip and the bottom of the cassette. The other adhesive layer is situated on that surface of the flexible strip which faces the ferromagnetic foil and engages only the flexible strip and the ferromagnetic foil.

22 Claims, 2 Drawing Sheets

CONTAINER FOR PHOTOSENSITIVE MATERIAL

BACKGROUND OF THE INVENTION

The invention relates generally to a cassette for photosensitive material.

More particularly, the invention relates to a cassette for accommodating a sheet of x-ray film.

A known cassette for accommodating a sheet of x-ray film has a pair of cooperating members which are movable between an open position, and a closed position in which the members define a closed compartment for the film. Locking elements are provided to arrest the cooperating members in the closed position. A flexible magnetic sheet is secured to one of the members and has a size which is the same or approximately the same as that of the film compartment or the sheet of film. A ferromagnetic foil which cooperates with the magnetic sheet is mounted on the other of the cooperating members. The magnetic foil is mounted on the respective member by means of a connecting element which permits the magnetic foil to move a limited amount relative to the member. One or more fluorescent or intensifying screens are provided and are located adjacent to the film in the closed position of the cassette. The magnetic sheet and magnetic foil, which are attracted to one another, flank the film and the intensifying screen or screens. The force of attraction between the magnetic sheet and the magnetic foil urges the intensifying screen or screens into firm engagement with the film.

A cassette of the type outlined above is disclosed in the German Offenlegungsschrift No. 29 17 547. In this cassette, the member which supports the magnetic foil is provided with a strip of foamed material which extends circumferentially of the member. The magnetic foil is adhesively secured to the foamed strip and the latter constitutes the connecting element via which the magnetic foil is mounted on the respective cassette member for movement relative thereto The magnetic foil can undergo limited movement in a direction normal to the cassette member as well as in directions parallel to the member. Limited movement of the magnetic sheet or magnetic foil relative to the respective cassette member is necessary in a cassette of the type which employs a pair of magnetic elements to urge the intensifying screen or screens into engagement with the film. This stems from the fact that the cooperating members of the cassette are somewhat flexible and may undergo some deformation when the cassette is opened and closed. By mounting the magnetic sheet or the magnetic foil for movement relative to the respective cassette member, the magnetic sheet or magnetic foil can adjust to deformation of the cassette members. This so-called "floating suspension" of the magnetic sheet or magnetic foil is also useful in compensating for differences in the coefficient of thermal expansion of the cassette members, the magnetic sheet or magnetic foil and the intensifying screen or screens.

It has been found that the connecting element in the known cassette does not permit the magnetic sheet or magnetic foil to undergo sufficient movement relative to the respective cassette member in a direction perpendicular to the latter. This can result in damage to the movably mounted magnetic foil or magnetic sheet.

OBJECTS AND SUMMARY OF THE INVENTION

It is an object of the invention to reduce the danger of damage to a moveably mounted magnetic element.

Another object of the invention is to provide a cassette of the type described above in which the degree of relative movement of a magnetic element and a cassette member in a direction perpendicular to the latter is increased.

An additional object of the invention is to provide an improved connecting or mounting element for connecting a cassette member and a magnetic element.

The preceding objects, as well as others which will become apparent as the description proceeds, are achieved by the invention.

One aspect of the invention resides in a cassette for photosensitive material, particularly x-ray film. The cassette comprises:

a. A pair of cooperating members moveable between an open position, and a closed position in which the members define a closed compartment for photosensitive material.

b. A pair of cooperating magnetic elements arranged to flank photosensitive material in the compartment in the closed position of the cassette.

c. At least one connecting element connecting one of the magnetic elements with one of the cooperating members in such a manner as to permit relative movement of the magnetic element and the member. The connecting element includes a first connecting portion which engages the magnetic element but not the cassette member. The connecting element further includes a second connecting portion which engages the cassette member but not the magnetic element. The first and second connecting portions are offset from one another and the connecting element also includes an intermediate connecting portion connecting the first and second connecting portions with one another.

The intermediate connecting portion may be free of contact with both the magnetic element and the cassette member.

In a preferred embodiment of the invention, the intermediate connecting portion is flexible.

The invention makes it possible for the magnetic element and the cassette member to undergo a relatively large amount of relative movement in a direction transverse to the cassette member. In spite of the fact that a relatively large amount of relative movement may be achieved, the thickness of the cassette according to the invention may be less than that of a cassette which employs a conventional foamed strip as a connecting element. Furthermore, the connecting element of the invention permits relative movement of the magnetic element and the cassette member to occur in directions parallel to the cassette member so that relative changes in dimensions between the magnetic element and the cassette member may be compensated for.

The novel features which are considered as characteristic of the invention are set forth in particular in the appended claims. The improved cassette itself, however, both as to its construction and its mode of operation, together with additional features and advantages thereof, will be best understood upon perusal of the following detailed description of certain specific embodiments with reference to the accompanying drawings.

DESCRIPTION OF THE PREFERRED EMBODIMENTS

Figure 1:
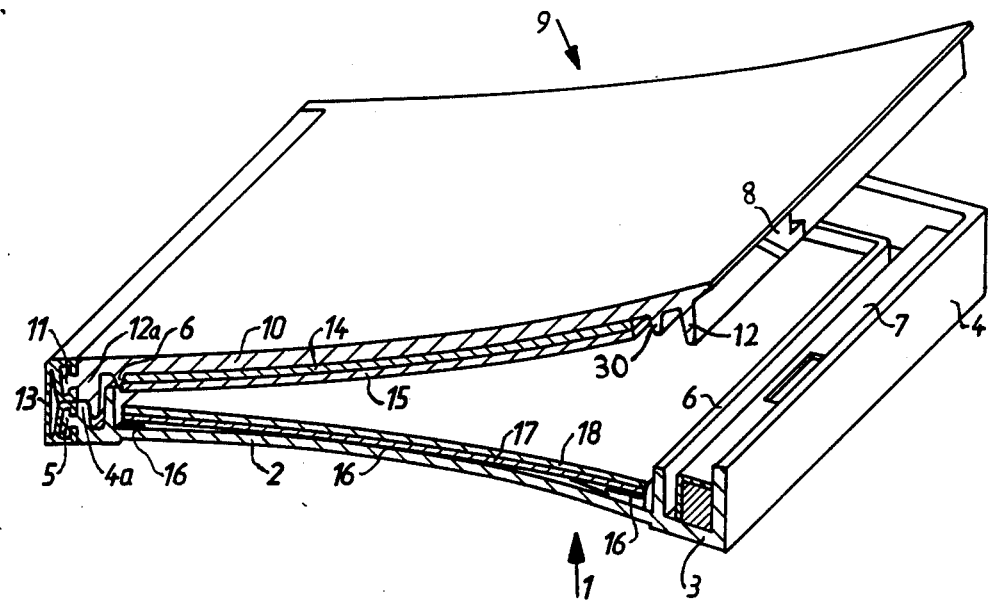
FIG. 1 is a perspective view of a partly open, sectioned cassette in accordance with the invention.

FIG. 1 illustrates a cassette according to the invention for accommodating a sheet of x-ray film. The cassette includes a bottom or bottom member 1 and a cover or cover member 9. The bottom 1 and cover 9 may, for example, be composed of an acrylonitrile-butadiene-styrene copolymer. At one edge, the bottom 1 and cover 9 are connected with one another by means of a hinge 13. The bottom 1 and cover 9 are pivotable relative to one another about the hinge 13 between an open position such as illustrated and a closed position in which the bottom 1 and cover 9 define a closed or light-tight compartment for a sheet of x-ray film.

The bottom 1, which is generally rectangular, comprises a wall 2 as well as a frame 3 which borders the wall 2. The frame 3 includes an upstanding rim 4 which extends along three sides of the bottom 1, namely, the side remote from and parallel to the hinge 13 and the pair of sides perpendicular to the hinge 13. A rim 4a having a lesser height than the rim 4 extends along the fourth side of the bottom 1, that is, the side of the bottom 1 adjacent to the hinge 13. The side of the rim 4a which faces the hinge 13 is formed with a T-shaped rib 5 which is designed to engage a complementary portion of the hinge 13 to thereby connect the bottom 1 to the hinge 13. The frame 3 also includes an upstanding rim 6 which extends along all four sides of the bottom 1 and is slightly inwardly spaced from the rims 4 and 4a. The rim 6 bounds an area which is designed to receive a sheet of x-ray film and is approximately equal in size to the latter.

A latch 7 is located in the space between the rims 4 and 6 on the side of the bottom 1 remote from the hinge 13. The latch 7 is designed to cooperate with a hook 8 provided on the corresponding side of the cover 9. The latch 7 and hook 8 function to arrest the bottom 1 and cover 9 in the closed position.

The cover 9 comprises a wall 10 which is formed with a downwardly projecting rim 12. The rim 12 extends along three sides of the cover 9, namely, the side remote from and parallel to the hinge 13 as well as the two sides which are normal to the hinge 13. At the fourth side of the cover 9, that is, the side adjacent to the hinge 13, the wall 10 is provided with a downwardly projecting rim 12a. The side of the rim 12a which faces the hinge 13 is formed with a T-shaped rib 11 which engages a complementary portion of the hinge 13 to thereby connect the cover 9 with the hinge 13. The wall 10 has a second downwardly projecting rim 30 which extends along all four sides of the cover 9 and is slightly inwardly spaced from the rims 12 and 12a.

In the closed position of the cassette, the rims 4, 4a, 6 of the bottom 1 cooperate with the rims 12, 12a, 30 of the cover 9 to seal the film compartment against light.

A magnetic sheet or element 14 is secured to the inner surface of the cover 9, that is, the surface of the cover 9 which faces the bottom 1. The magnetic sheet 14, which is preferably flexible, may be composed of any magnetic material conventionally used in cassettes of the type having a pair of magnetic elements which attract one another. The magnetic sheet 14 has the same or approximately the same size as the film compartment and may, for instance, be adhesively secured to the inner surface of the cover 9. A sheet-like fluorescent screen or intensifying element 15 is attached to the magnetic sheet 14, e.g. by means of an adhesive. It will be observed that the cover 9, the magnetic sheet 14 and the fluorescent screen 15 have a layered or sandwich-like arrangement.

Connecting or mounting elements 16 are situated on the inner surface of the wall 2 of the bottom 1, that is, the surface of the wall 2 which faces the cover 9. The connecting elements 16 support a ferromagnetic foil or element 17. The ferromagnetic foil 17 may be composed of any material conventionally used in cassettes of the type having a pair of magnetic elements which attract one another. By way of example, the ferromagnetic foil 17 may be composed of steel. On the side thereof remote from the connecting elements 16, the ferromagnetic foil 17 carries a sheet-like fluorescent screen or intensifying element 18. When a sheet of film is placed in the cassette and the cassette is closed, one of the fluorescent screens 15 and 18 is located on either side of the film. The magnetic sheet 14 and ferromagnetic foil 17, in turn, flank the fluorescent screens 15, 18 and the film. The magnetic sheet 14 and ferromagnetic foil 17 attract one another thereby urging the fluorescent screens 15, 18 into intimate engagement with the film.

Figure 2:
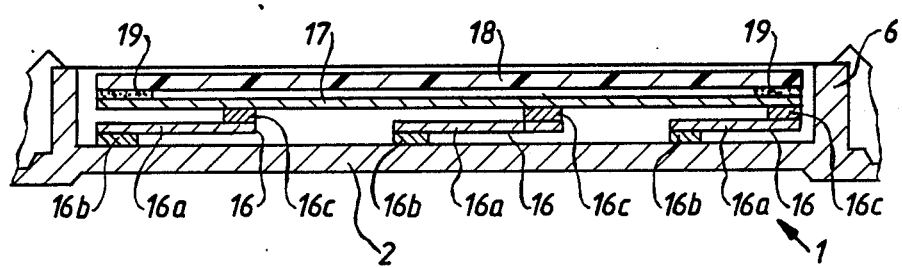
FIG. 2 is an enlarged longitudinal cross-sectional view of the bottom member of the cassette of FIG. 1.
Figure 3:
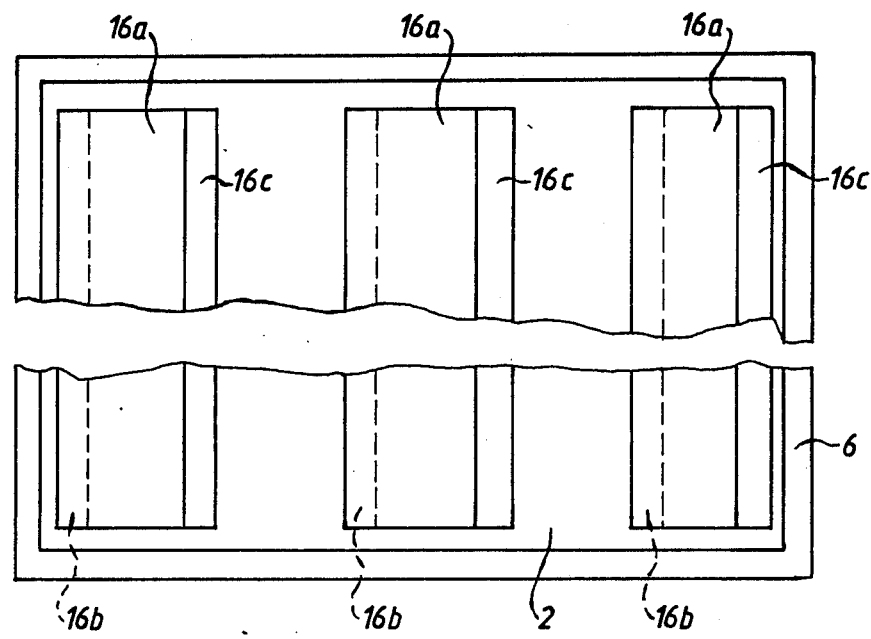
FIG. 3 is a plan view of the bottom of the cassette of FIG. 1 with certain elements omitted to illustrate the connecting elements of the invention.

FIGS. 2 and 3 clearly show the arrangement of the connecting elements 16, the ferromagnetic foil 17 and the fluorescent screen 18. Three of the connecting elements 16 are illustrated in FIGS. 2 and 3.

Each of the connecting elements 16 comprises an intermediate connecting portion in the form of a strip-like foil 16a. The connecting foils 16a are arranged in parallelism with one another and extend parallel to the longitudinal direction of the cassette. The connecting foils 16a are elongated and flexible. The connecting foils 16a are situated between and are normally free of contact with the ferromagnetic foil 17 and the wall 2 of the bottom 1.

Each of the connecting foils 16a has a surface which faces the wall 2 of the bottom 1 and another surface which faces the ferromagnetic foil 17. A first connecting portion in the form of a strip-like adhesive layer 16c is provided on that surface of each connecting foil 16a which faces the ferromagnetic foil 17. The adhesive layers 16c bond the respective connecting foils 16a to the ferromagnetic foil 17. The adhesive layers 16c extend longitudinally and run along substantially the entire lengths of the respective connecting foils 16a.

A second connecting portion in the form of a strip-like adhesive layer 16b is provided on that surface of each connecting foil 16a which faces the wall 2 of the bottom 1. The adhesive layers 16b bond the respective connecting foils 16a to the wall 2. The adhesive layers 16b extend longitudinally and run along substantially the entire lengths of the respective connecting foils 16a.

The adhesive layers 16b engage the wall 2 of the bottom 1 but not the ferromagnetic foil 17 while the adhesive layers 16c engage the ferromagnetic foil 17 but not the wall 2. Furthermore, for each connecting element 16, the adhesive layer 16b is offset from the adhesive layer 16c, that is, the respective adhesive layers 16b and 16c are not superimposed with one another.

The adhesive layers 16b and 16c are preferably parallel to the longitudinal edges of the connecting foils 16a. It is further advantageous for the adhesive layers 16b and 16c to be situated at the longitudinal edges of the connecting foils 16a.

The connecting elements 16 are preferably designed in the same manner. In this regard, it will be observed that the relative orientations of the respective adhesive layers 16b and 16c are the same for all of the connecting elements 16.

The fluorescent screen 18 is secured to the side of the ferromagnetic foil 17 remote from the connecting elements 16. To this end, a circumferentially complete band 19 extends along the perimeter of the ferromagnetic foil 17 on the side thereof which faces away from the connecting elements 16. The band 19 is adhesive on both sides and thereby bonds the fluorescent screen 18 to the ferromagnetic foil 17.

A cassette constructed in accordance with the invention makes it possible for the composite comprising the ferromagnetic foil 17 and the fluorescent screen 18 to undergo a relatively large amount of movement relative to the wall 2 of the bottom 1 in a direction transverse or normal to the wall 2. In fact, the amount of relative movement may equal or approximate the thickness of a connecting foil 16a minus the combined thickness of the adhesive layers 16b and 16c.

The amount of relative movement in directions parallel to the wall 2 depends to a large extent on the flexibility of the connecting foils 16a. In order to facilitate relative movement in these directions, each of the connecting foils 16a may be provided with one or more weakened regions in the area between the respective adhesive layers 16b and 16c.

Figure 4:
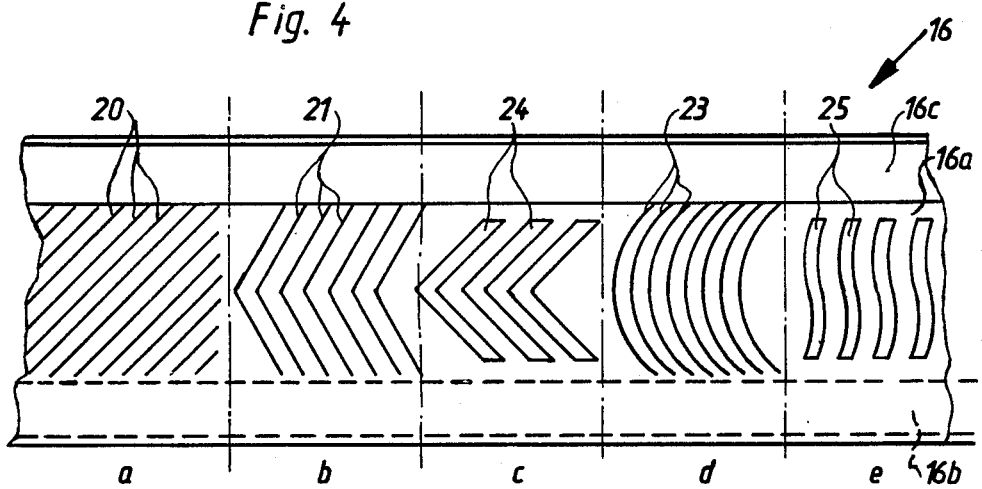
FIGS. 4a-4e show various embodiments of the connecting elements of the invention.

According to one embodiment of the invention, the weakened regions may be in the form of grooves as illustrated in FIGS. 4a, 4b and 4d. FIG. 4a shows that the connecting foils 16a may be provided with linear, inclined grooves 20. FIG. 4b illustrates that the connecting foils 16a may be formed with V-shaped grooves 21. FIG. 4d shows that the connecting foils 16a may be provided with arcuate grooves 23. The grooves 20, 21 and 23 are situated between the respective adhesive layers 16b and 16c.

According to another embodiment of the invention, the weakened regions may be in the form of band-like cutouts as illustrated in FIGS. 4c and 4e. FIG. 4c demonstrates that the connecting foils 16a may be provided with V-shaped cutouts 24. FIG. 4e shows that the connecting foils 16a may be formed with S-shaped cutouts 25.

The connecting foils 16a may be composed of a synthetic resin. It is preferred for the connecting foils 16a to be composed of a polyester. It is further advantageous to coat both sides of the ferromagnetic foil 17 with a synthetic resin foil for corrosion protection. These synthetic resin foils are again preferably composed of a polyester. Coating the ferromagnetic foil 17 with the same material as that constituting the connecting foils 16a provides the advantage that the coefficient of thermal expansion of the coating on the ferromagnetic foil 17 is the same as that of the connecting elements 16.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A cassette for photosensitive material, particularly x-ray film, comprising:
   (a) a pair of cooperating members movable between an open position, and a closed position in which said members define a closed compartment for photosensitive material;
   (b) a pair of cooperating magnetic elements arranged to flank photosensitive material in said compartment in said closed position; and
   (c) a plurality of discrete connecting elements connecting one of said magnetic elements with one of said members in such a manner as to permit relative movement of said one magnetic element and said one member, each connecting element including a first connecting portion which engages said one magnetic element but not said one member, and each connecting element further including a second connecting portion which engages said one member but not said one magnetic element, each connecting element also including an intermediate connecting portion connecting the respective first and second portions with one another, and each of said intermediate portions being constituted by a flexible foil having a first edge which faces one side of said compartment, and a second edge which faces the opposite side of said compartment and is spaced from the respective first edge, the first portion of each connecting element being located in the region of the first edge of the respective intermediate portion, and the second portion of each connecting element being located in the region of the second edge of the respective intermediate portion so that the first and second portions of each connecting element are offset from one another, each connecting element being secured to said one magnetic element exclusively at the respective first portion, and to said one member exclusively at the respective second portion.

2. The cassette of claim 1, wherein said intermediate connecting portions are normally free of contact with said one magnetic element and said one member.

3. The cassette of claim 1, comprising an intensifying element on that side of said one magnetic element remote from said connecting elements, said intensifying element being fixed to said one magnetic element.

4. The cassette of claim 3, wherein said magnetic elements and said intensifying element are sheet-like, said compartment being designed to accommodate a sheet of photosensitive material.

5. The cassette of claim 1, wherein said intermediate portions have the same width as considered in a direction from one side to said other side of said compartment.

6. The cassette of claim 1, wherein said intermediate connecting portion is strip-like.

7. The cassette of claim 1, comprising locking means for arresting said members in said closed position.

8. The cassette of claim 1, wherein said intermediate connecting portions are designed in substantially the same manner and have substantially the same orientation.

9. The cassette of claim 1, wherein the other of said magnetic elements is flexible.

10. The cassette of claim 1, wherein the other of said magnetic elements is secured to the other of said members.

11. The cassette of claim 1, wherein said one magnetic element is ferromagnetic.

12. The cassette of claim 1, comprising a pair of intensifying elements which are flanked by said magnetic elements in said closed position and are arranged to flank photosensitive material in said compartment in said closed position.

13. The cassette of claim 12, wherein said intensifying elements and said magnetic elements have sizes which at least approximate that of said compartment.

14. The cassette of claim 1, wherein said intermediate connecting portions are substantially parallel to one another.

15. The cassette of claim 1, wherein said intermediate connecting portions are strip-sharp, and said edges are longitudinal edges.

16. The cassette of claim 1, wherein said first and second connecting portions extend along substantially the entire lengths of said edges.

17. The cassette of claim 1, wherein said first and second connecting portions comprise an adhesive.

18. The cassette of claim 17, wherein said first and second connecting portions respectively comprise adhesive strips.

19. The cassette of claim 15, wherein said one magnetic element is a ferromagnetic foil, and the other of said magnetic elements is a flexible magnetic sheet secured to the other of said members and having a size which is at least approximately equal to that of said compartment, said first and second connecting portions extending along substantially the entire lengths of the respective edges; and further comprising locking means for arresting said members in said closed position, and at least one intensifying sheet secured to that side of said ferromagnetic foil remote from said connecting elements.

20. The cassette of claim 1, wherein each intermediate connecting portion is provided with at least one region of reduced bending resistance between the respective first and second connecting portions.

21. The cassette of claim 20, wherein said one region is in the form of a groove.

22. The cassette of claim 20, wherein said one weakened region is in the form of a cutout.

* * * * *